United States Patent
Low et al.

[15] 3,656,352
[45] Apr. 18, 1972

[54] IMPACT MONITORING APPARATUS

[72] Inventors: George M. Low, Acting Administrator of the National Aeronautics and Space Administration in respect to an invention of; Leland O. Mortensen, 1465 B. North Glassell, Orange, Calif. 92667

[22] Filed: Dec. 2, 1970

[21] Appl. No.: 94,374

[52] U.S. Cl. ...........................73/492, 73/12, 116/114 AH
[51] Int. Cl. .....................................................G01p 15/04
[58] Field of Search.............116/114 AH; 188/1 R, 1 B, 1 C; 267/162, 163, 164, 165; 73/12, 492, 396

[56] References Cited

UNITED STATES PATENTS

| | | | |
|---|---|---|---|
| 3,313,567 | 4/1967 | Sturman | 188/1 C X |
| 2,825,297 | 3/1958 | Harrison | 116/114 AH |
| 3,097,534 | 7/1963 | Pasieka | 73/492 |
| 2,207,204 | 7/1940 | Peyton et al. | 73/12 UX |
| 2,601,440 | 6/1952 | Kerrigan | 116/114 AH |

*Primary Examiner*—Charles A. Ruehl
*Attorney*—Edward K. Fein, Marvin F. Matthews and John R. Manning

[57] ABSTRACT

An impact monitoring apparatus for indicating and recording the magnitude of force imposed in a specific direction on a particular axis of interest comprising two parallel saw-tooth leaf springs mounted in cantilever fashion one above the other. The upper leaf spring supports at its free end a designated mass. Upon experiencing a force or shock along the axis of interest the free ends of the springs are deflected so that the saw-tooth portions thereof mechanically engage and lock into one another. Movement of the upper spring is amplified by the mass thereon. Engagement of the springs occurs along a length from the free end, the extent of engagement being proportional to the magnitude of the force experienced.

10 Claims, 2 Drawing Figures

PATENTED APR 18 1972          3,656,352

Leland O. Mortensen
INVENTOR

BY Edward K. Fein
ATTORNEY

3,656,352

IMPACT MONITORING APPARATUS

ORIGIN OF THE INVENTION

The invention described herein was made in the performance of work under a NASA Contract and is subject to the provisions of Section 305 of the National Aeronautics and Space Act of 1958, Public Law 85–568 (72 Stat. 435; 42 U.S.C. 2457).

BACKGROUND OF THE INVENTION:

This invention relates to a device for indicating and recording shock or impact. More particularly the invention is directed to a device for indicating and recording the shock or impact experienced by a shipped item.

During the shipment of merchandise and other items from one location to another there is experienced frequently numerous handling operations in which the merchandise can be dropped, bumped or merely jarred with sufficient force to cause damage. Even with careful handling, damage frequently occurs to the merchandise as a result of the shipment itself. Commonly, the merchandise may be entrusted to a number of different shippers during the course of its transportation from one location to another and although each of the shippers is responsible for the safe transportation of the goods while the same are within his possession, it is difficult, if not impossible, for the ultimate recipient of the goods to ascertain at which point in a journey injury or damage to the property occurred. This is simply because the containers for the goods are not generally opened until they reach their destination. As a result, liability for the damage cannot be attributed to the responsible party and there is produced an environment of dissatisfaction and disagreement over payment for the damage. In addition to the problem of liability, the nature of the shipped item may be such that it would be desirable to ascertain whether a particular shock was encountered which might affect the item in a way not obvious by casual inspection.

The particular problems described hereinabove are not ones which have gone unrecognized by industry and commerce heretofore. Various devices have been conceived and utilized for the purpose of trying to fix the responsibility for damage to goods during the course of their transportation, or at least to register the fact that the goods have encountered a shock. These devices have taken the form of simple frangible balls disposed within the container and which are adapted to fracture upon receipt of a designated impact, to more complicated and sophisticated contrivances which are adapted to register the magnitude of an impact force during the course of a designated journey. Moreover such devices are deficient because they can be used only once and then must be replaced, they are relatively expensive and require attention and maintenance, and may usually not be calibrated in order to preclude actuation in minimal force regimes.

SUMMARY OF THE INVENTION:

The instant invention obviates all of the aforementioned deficiencies in the prior art by providing a pair of spaced, cantilever spring members, one of which carries a designated mass on its free end in order to amplify oscillation thereof upon experiencing a force. The spring members are of saw-tooth construction so that the application of the force causes them to deflect into contact with one another, thereby resulting in the mutual engagement of the saw-tooth surfaces. Visual inspection then reveals the fact that a designated impact has occurred. There is thus provided a shock indicating device which is particularly inexpensive because it has substantially no moving parts. It is practically error proof in its response and, in addition, requires no maintenance. Still further, it is reusable after every journey and need only be reset in a matter of seconds for that purpose. The device is further characterized by provisions for selective calibration so that its sensitivity to varying impact ranges is made possible. These and numerous other features and advantages of the present invention will become readily apparent upon a reading of the following detailed description, claims and drawings wherein like numerals denote like parts in the several views and wherein:

Figure 1:
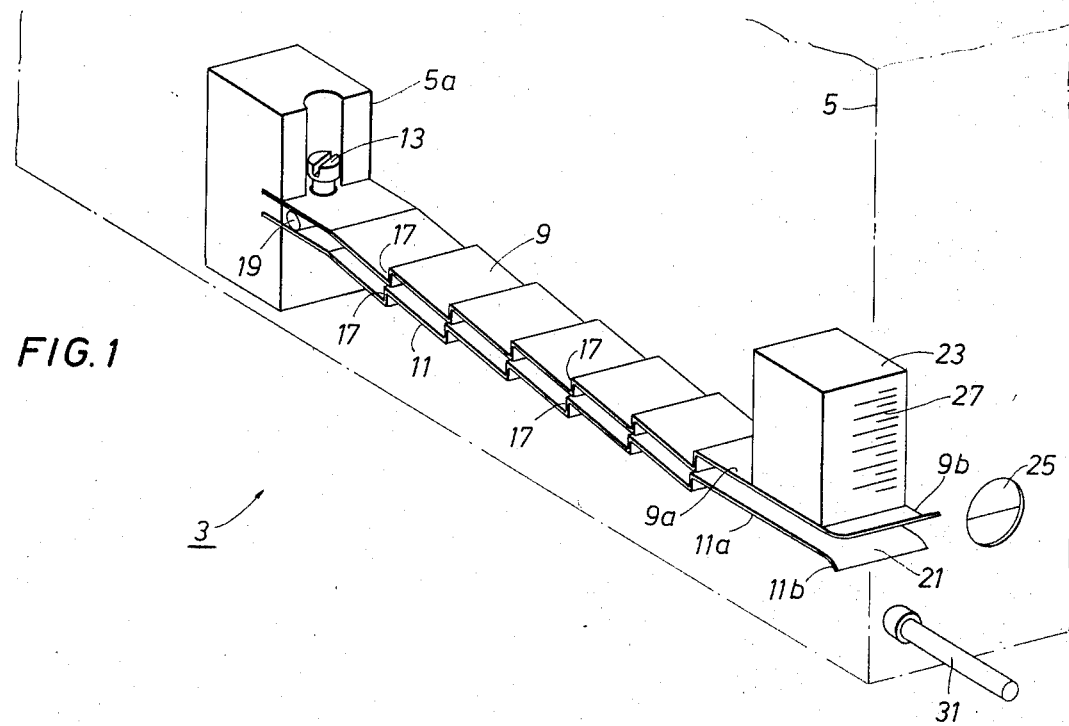
FIG. 1 illustrates a perspective view of the shock indicating device of the invention.

DETAILED DESCRIPTION:

With reference now to the drawings the shock indicating device 3 is preferably enclosed in housing 5 which, in itself, may be the wall of a shipping container or the like. Similarly the device 3 may be directly affixed to the item or goods being transported. The shock indicating device essentially comprises a pair of parallel, cantilever mounted upper and lower springs 9 and 11 respectively. The springs are fixed at their supported ends to the support member 5a mounted on housing 5. A substantial length of each of the springs 9, 11 is characterized by a series of serrations 17 of razor-back configuration, the serrations of spring 9 being disposed in parallel fashion and in substantially overlying adjacent relationship to the serrations of spring 11. Each spring 9, 11 has at its free end an elongate arm section 9a, 11a. Each arm section 9a, 11a is further characterized by an outwardly directed lip 9b, 11b so as to thereby form a mouth area 21.

Figure 2:
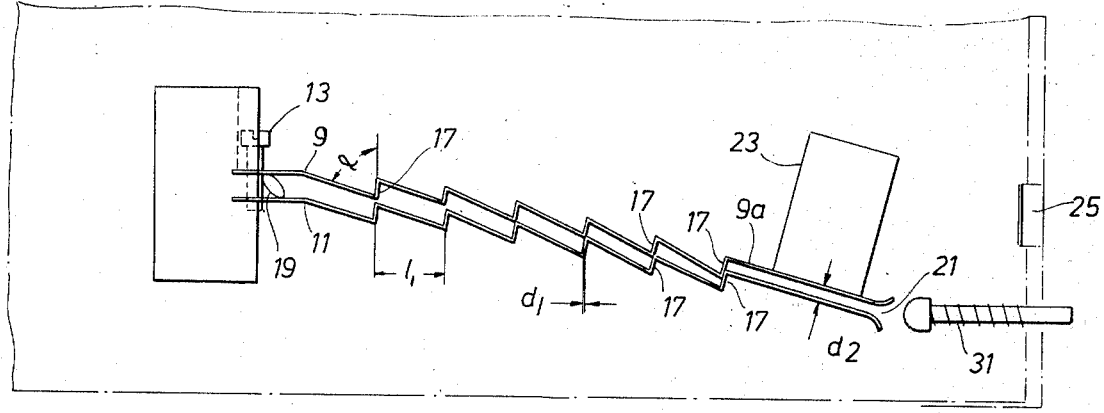
FIG. 2 illustrates a side view of the device of FIG. 1.

Affixed to the upper surface of arm section 9a of upper spring 9 is a designated mass, generally indicated as 23. The purpose of the mass is to amplify any environmental force experienced by the shock indicating device so that upper spring 9 will move towards a latching or locking engagement with lower spring 11 upon contact of the mutual serrations 17. As shown in FIG. 2 the serrations 17 will first contact one another at their free ends, that is the spring end proximate the elongate arm sections 9a, 11a. As the magnitude of the impact force increases there occurs a correlative engagement of serrations so that the distance from the free end of the springs at which latching occurs is indicative of the degree of shock or impact sustained.

As may be recognized, the spectra of response to different force magnitudes of the shock indicating device herein may be varied by changing the angular relation alpha $\alpha$ of the serrations 17, the length $l_1$ of the serrations, the distance $d_1$ between the substantially vertical walls of the serrations and the distance $d_2$ which separates the elongate arm sections 9a, 11a of the springs. Other factors such as the material of the springs, the spring constant K and the like will have predictable effects upon the spectrum of force response. Adjustment of the response characteristics may also be varied by movement of threaded cam 19. The position of the tension cam may be altered by operation of thumb screw 13 which has cooperating spline threads (not shown) thereon for engaging the cam threads. Thus, it is readily visualized that as the major axis of the elliptically shaped cam 19 is moved towards the vertical position a greater force becomes necessary for latching.

As shown in FIG. 1 the operational environment of the shock indicating device 3 may consist of the housing 5 which encloses the device within a shipping container. Provided in a wall of the housing 5 is a window 25, the purpose of which is to view the calibrated scale 27 on the surface of mass 23. Directly adjacent to and beneath the window 25 a plunger means 31 may be incorporated, the function of which is to disengage the cantilever springs after they have experienced a latching force. Thus, in practice, the device 3 is set in operational position by disposing the two springs in their normal unflexed, unlatched, substantially parallel relation as shown in FIG. 1. If at some point during transportation of the item a shock is encountered with a force vector perpendicular to the plane of the springs, such force will cause latching of the springs by reason of the downward movement of mass 23, the degree of latching of the serrations corresponding to the magnitude of the downward force imparted. The latched springs, as shown in FIG. 2, are then fixed in distorted relationship and, due to the downward locked position of mass 23, the relative magnitude of the force can be read through window 25 by viewing the calibrated scale 27. In order to release the springs and reset the device, one need only manually separate the latched springs or depress the spring loaded plunger 31 so as to pry apart the lips 9b and 11b of mouth 21.

While the device as positioned in the drawings will serve to monitor vertical shocks in one direction, such as that encountered by being dropped, it is contemplated that more such devices mounted in different attitudes will be necessary to monitor shocks in other directions.

It should be recognized that the device disclosed hereinabove may be utilized for functions other than impact monitoring. For example it may find service as an apparatus for controlling or limiting rebound deflection, or as a means for measuring acceleration of a body, the latter by recording the maximum longitudinal engagement of the springs as that length is related to a predetermined force of acceleration. In addition, the displacement of the mass may be determined by magnetic, electro-optical or other electronic means permitting the device to be used as the control element in acceleration/force operated initiator or fuzing systems. Similarly various structural modifications should be construed within the scope and meaning of the claims. For example, linear latching of the springs may occur even if they are supported at each end, this by disposing the predetermined mass intermediate the ends. Numerous such modifications are anticipated and considered to reside within the spirit of the invention.

That which is claimed and desired to be secured by United States Letters Patent is:

1. A monitoring apparatus for detecting a force comprising:
a plurality of spaced, elongate, resilient spring means adapted to be supported on the article to be monitored, said spring means being normally disposed in adjacent, spaced-apart, longitudinally parallel relation to one another in an unstressed first position, and cooperating locking means on said spring means for coupling said spring means to one another along their length when in a stressed second position which is produced when a force is incurred by the article.

2. The apparatus of claim 1 further including a mass means on one of said spring means for causing the amplitude of resilient movement of the loaded spring means to exceed that of the unloaded spring means.

3. The apparatus of claim 1 wherein said spring means are disposed substantially one about the other for monitoring forces in the common plane of the spring means, and further including
a mass means supported on the upper spring means for causing the force experienced by the apparatus to amplify movement of the upper spring.

4. An impact monitoring apparatus for detecting and recording the maximum magnitude of a force vector applied parallel to a predetermined axial direction comprising:
a plurality of elongate, resilient saw-tooth leaf spring means supported in adjacent, spaced-apart, longitudinally parallel relation to one another for cooperatively locking together at selective positions along their length upon transmission of the force thereto, the extent of longitudinal engagement being proportional to the magnitude of the transmitted force.

5. The impact monitoring apparatus of claim 4 wherein said spring means are positioned one above the other in order to monitor forces in the vertical plane, and further including
a mass means carried by one of said spring means for amplifying deflection thereof when subjected to a force in said plane.

6. The impact monitoring apparatus of claim 5 wherein at least one of said spring means is mounted in cantilever manner so that the free end thereof is adapted to deflect in response to the applied force, and wherein said mass means is carried by said free end for amplifying the deflection caused by the force.

7. The impact monitoring apparatus of claim 5 wherein each said spring means is mounted in cantilever manner so that the free ends thereof are adapted to deflect in response to the applied force and wherein said mass means is carried by one of the free ends for amplifying the deflection caused by the force.

8. The impact monitoring apparatus of claim 4 wherein at least one of said spring means is mounted in cantilever manner so that the free end thereof is adapted to deflect in response to the applied force, and further including a mass means on said free end of said spring means for amplifying the deflection caused by the force.

9. The impact monitoring apparatus of claim 8 wherein said spring means includes locking adjustment means for varying the locking probability of the springs in response to any given force.

10. The impact monitoring apparatus of claim 4 wherein each said spring means is mounted in cantilever manner so that the free ends thereof are disposed adjacent one another and are adapted to deflect in response to the applied force, and further including a mass means on one of said free ends for amplifying the deflection caused by the force.

* * * * *